United States Patent

Brojdo

[15] 3,686,645

[45] Aug. 22, 1972

[54] CHARGE STORAGE FLIP-FLOP

[72] Inventor: Samuel Brojdo, Westfield, N.J.

[73] Assignee: Bell Telephone Laboratories Incorporated, Murray Hill, N.J.

[22] Filed: Oct. 1, 1968

[21] Appl. No.: 764,186

[52] U.S. Cl. ............340/173 FF, 307/238, 307/292, 340/173 R, 340/173 LS

[51] Int. Cl......G11c 11/40, G11c 11/42, H03k 3/286

[58] Field of Search.......340/173; 307/238, 279, 292

[56] References Cited

UNITED STATES PATENTS

| | | | |
|---|---|---|---|
| 3,537,078 | 10/1970 | Pomeranz | 340/173 |
| 3,028,507 | 4/1962 | Sacks | 340/173 |
| 3,067,336 | 12/1962 | Eachus | 340/173 |
| 3,284,640 | 11/1966 | Lindell | 307/238 |

*Primary Examiner*—Terrell W. Fears
*Attorney*—R. J. Guenther and Arthur J. Torsiglieri

[57] ABSTRACT

The invention uses nonlinear impedance elements connected to the pair of transistors in a flip-flop such that the base of each transistor is connected to a high impedance if the power supply voltage is removed. Inasmuch as the high impedance forces a slow decay of charge stored in the transistors, the state of the flip-flop can be maintained by a pulsed power supply with a consequent reduction in average stand-by power. Further, using photosensitive transistors, photogenerated charge can be integrated and held. Advantageously, the apparatus is provided as an integrated circuit semiconductor memory array.

14 Claims, 6 Drawing Figures

INVENTOR
S. BROJDO
BY
A. J. Torsiglieri
ATTORNEY

CHARGE STORAGE FLIP-FLOP

BACKGROUND OF THE INVENTION

This invention relates to semiconductor memories which employ an array of bistable circuits of semiconductor elements as the memory cells.

Bistable semiconductor memory cells of the prior art typically have been powered by direct current power supplies during stand-by periods because the cells have been unable to remember their state for appreciable periods of time after removal of the power supply voltage. A known exception, disclosed in "Pulse Powered Circuits" by R. H. Baker et al., *NEREM RECORD*, page 134, 1965, uses a capacitor connected to the bistable circuit to store the state of the cell during application of a power supply voltage. The charge stored in the capacitor is then used to maintain the state of the flip-flop after the power supply voltage is removed. For this reason, the flip-flop can be powered by a pulsed power supply with a consequent reduction in average power dissipation. However, capacitors are generally undesirable for integrated circuits because they require relatively large areas.

An object of this invention is an inexpensive, integrable semiconductor memory cell which can remember its state for an appreciable period of time after removal of the power supply voltage, and so can be used with a pulsed power supply.

A further object of this invention is a semiconductor memory cell having increased sensitivity to writing signals.

A still further object of this invention is a semiconductor memory cell into which information can be written optically.

SUMMARY OF THE INVENTION

In accordance with the present invention, nonlinear impedance elements are connected into the base path of each of a pair of transistors in a flip-flop such that the base of each transistor is connected to a very high impedance when the power supply voltage is removed. Inasmuch as the high impedance prevents a fast discharge of the charge stored in the collector-base and the emitter-base capacitances of the transistor which was on, that same transistor will turn on again if the power supply voltage is restored within a given time. This time interval can be as long as 1 second or more. Because of the aforementioned charge storage feature, flip-flops according to this invention will be termed "charge storage flip-flops."

An important advantage of this invention is that the state of the flip-flop can be maintained by a pulsed power supply with a consequent reduction in average stand-by power.

A further useful characteristic of this invention is that if one of the flip-flop transistors is illuminated while the high impedance is connected to the transistor bases, photogenerated charge is integrated by the parallel combination of the collector-base and emitter-base capacitances of the illuminated transistor and by any capacitance within the high impedance element. Because of this integration of charge, the flip-flop is highly sensitive to optical writing signals.

Another important characteristic of this invention is that the capability of storing charge for an appreciable time interval after the power supply voltage is removed minimizes the problem of volatility of stored information in a semiconductor memory. If supply power is interrupted, there is sufficient time for emergency stand-by power to be switched on before stored information is lost.

In one advantageous embodiment of this invention, each cell in a word-organized semiconductor memory comprises a flip-flop made up of a pair of junction transistors, the collector of each being connected to a common word line through separate load impedances, and the emitter of each being connected to separate ones of a pair of digit lines. The collector of each transistor is also "forward connected" through a separate diode to the base of the other transistor, i.e., if the collector of one transistor is electrically positive with respect to the base of the other transistor, the diode is biased in the forward direction. The base of each transistor is also forward connected through a separate diode to a common control line.

In operation, the word line, in addition to providing a path for the conduction of information signals, provides the operating power for the circuit.

The flip-flop is discharged when the word line voltage is removed and the control line potential is negative. In this case, all four diodes conduct, effectively connecting a low impedance to each transistor base.

For writing into the flip-flop, the voltage on the control line is made positive such that all the diodes are turned off and the transistor bases are thereby connected to a very high impedance. Information then can be written into the cell by establishing an imbalance between the pair of transistors and applying a voltage to the word line. The imbalance can be established by illuminating selectively one of the transistors to produce photogenerated charge therein or by establishing a voltage differential between the two digit lines connected to the cell. Because of the high impedance connected to the base of each transistor, photogenerated charge is integrated by the parallel combination of emitter-base, collector-base, and diode capacitances.

Nondestructive readout is achieved by applying a sufficient voltage to the word line and detecting current in the appropriate digit line.

For applications in which it is not necessary to discharge the flip-flop before a writing operation, the control line and the diodes connected thereto may be omitted. It will be apparent that such applications include those in which the amplitudes of the writing signals are sufficient to overcome imbalances due to charge stored in the flip-flop.

BRIEF DESCRIPTION OF THE DRAWING

The invention will be better understood from the following more detailed description taken in conjunction with the accompanying drawing, in which:

FIG. 5 shows a schematic diagram of a modification of the circuit in FIG. 2 for advantageous use in integrated circuit form; and FIG. 6 shows a schematic diagram of a charge storage flip-flop in accordance with the invention connected into a diode-coupled, word-organized semiconductor memory.

Figure 1:
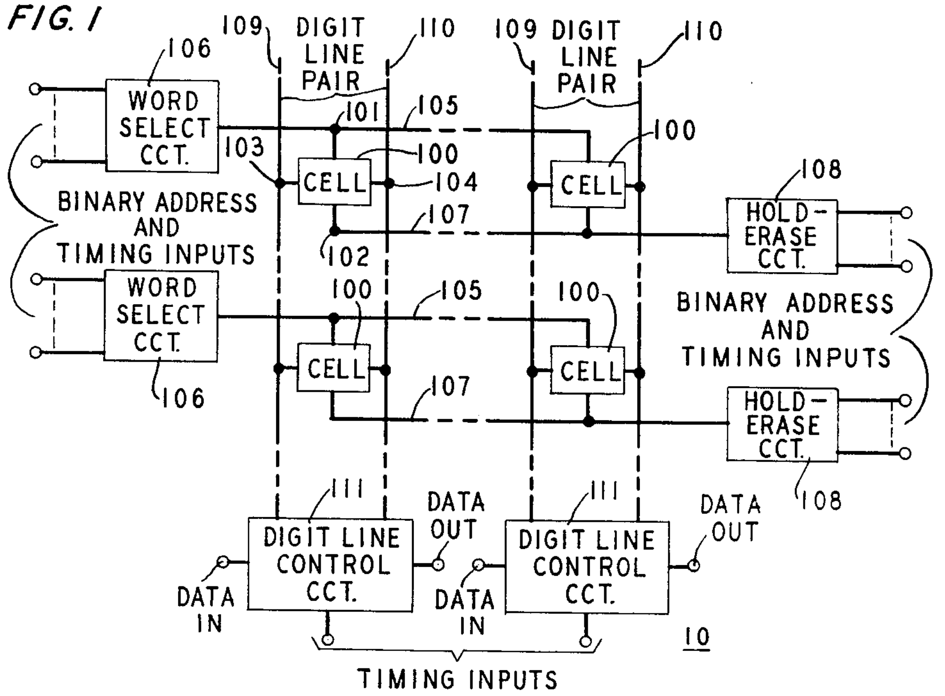
FIG. 1 shows in block schematic form a word-organized memory in which a charge storage flip-flop in accordance with the principles of this invention is advantageously employed.

Reference numerals are repeated in different figures where appropriate to denote equivalent elements.

DETAILED DESCRIPTION

With reference now to the drawing, in FIG. 1 are shown the basic elements of a word-organized memory 10 in which a charge storage memory cell in accordance with the principles of this invention is advantageously employed. A plurality of individual memory cells 100 are arranged in a two-dimensional array of rows and columns. Each cell 100 is a charge storage flip-flop having two stable states between which it can be switched for the storage of binary digits. As seen, each cell is provided with four terminals, of which one, 101, is connected to a word line conduction path, 105; one, 102, is connected to a hold-erase line conduction path, 107; and two, 103 and 104, are connected to separate lines of an associated digit line pair, 109 and 110. Each word line, 105, is driven by a word select circuit, 106, to which are supplied binary address and timing inputs in the usual fashion. Each hold-erase line, 107, is driven by a hold-erase control circuit, 108, to which binary address and timing inputs are also supplied. Each pair of digit lines 109 and 110, in turn, is connected to its own reading and writing control circuit 111, to which are applied storage data and timing inputs and from which are derived the stored data in conventional fashion. The operation of memory 10 will be described more fully hereinbelow.

Figures 2, 3:
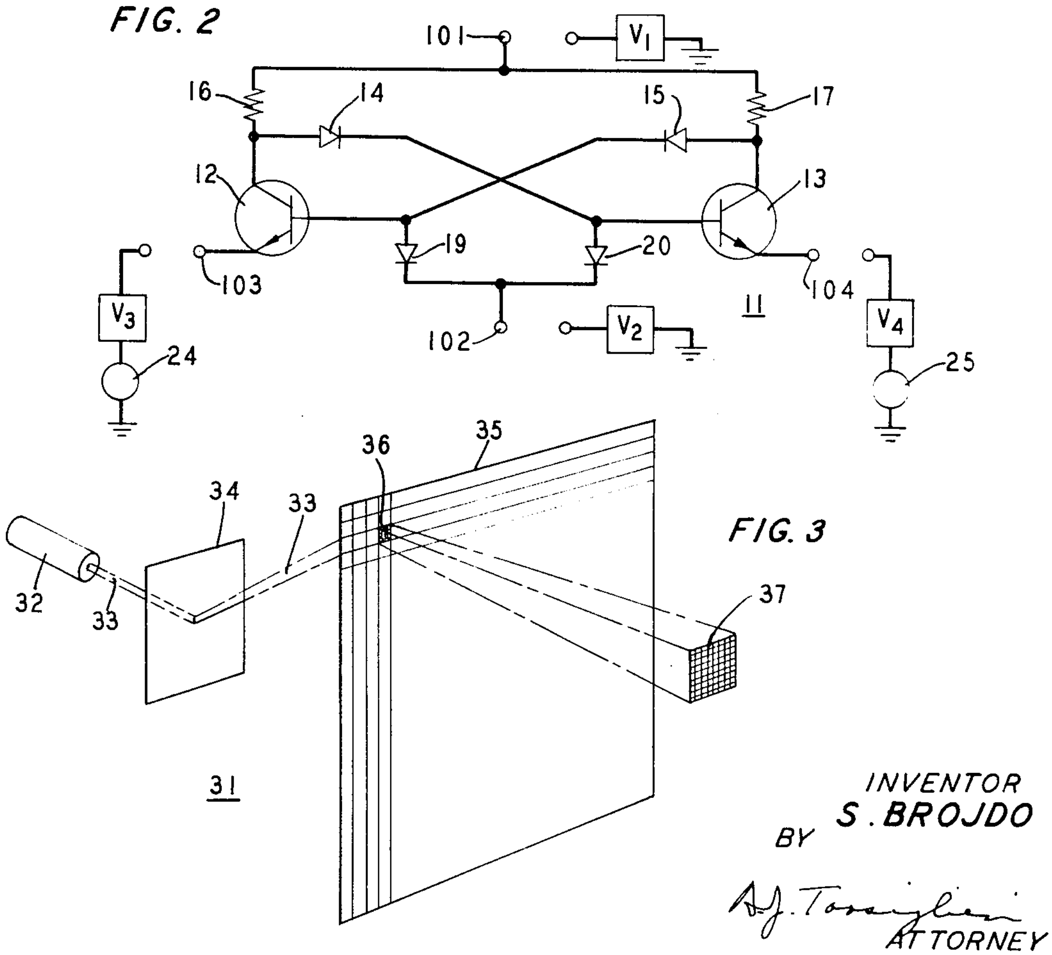
FIG. 2 shows a schematic circuit diagram of a charge storage flip-flop in accordance with the invention.
FIG. 3 shows a generalized block diagram of an optical memory system in which a charge storage flip-flop in accordance with the invention is advantageously employed.

In FIG. 2 there is shown a circuit schematic of a charge storage flip-flop 11 especially suitable for use as the cell 100 in the memory shown in FIG. 1. Flip-flop 11 comprises a pair of matched junction transistors 12 and 13, shown here illustratively of the NPN type, connected to form a flip-flop. To this end, the collector of transistor 12 is connected through a nonlinear element, diode 14, to the base of transistor 13, and the collector of transistor 13 is connected through a second nonlinear element, diode 15, to the base of transistor 12. The collectors of transistors 12 and 13 are also connected through separate matched load impedances 16 and 17, respectively, shown here illustratively as resistors, to a common terminal 101 for connection to a source of electric power $V_1$. The bases of transistors 12 and 13 are also connected through separate nonlinear elements, diodes 19 and 20, respectively, to a common control terminal 102 for connection to a source of electric power $V_2$. The emitter of transistor 12 is connected to a control terminal 103 for connection to a source of electric power $V_3$, and the emitter of transistor 13 is connected to control terminal 104 for connection to a source of electric power $V_4$. Low series resistance detectors 24 and 25 are shown in series with sources $V_3$ and $V_4$, respectively, schematically to indicate a means for detecting information stored in circuit 11.

Nonlinear elements 19 and 20, shown here illustratively as diodes, are adapted for providing a relatively very high impedance between the base of each transistor and terminal 102 when information is stored in the flip-flop and for providing a relatively low impedance between the base of each transistor and terminal 102 during an operation for discharging the flip-flop. Nonlinear elements 14 and 15, also shown here illustratively as diodes, are adapted for providing a relatively very high impedance between the base of each transistor and the collector of the other transistor when the information is stored in the flip-flop and for providing a relatively low impedance between the base of each transistor and the collector of the other transistor when the information is read out, electrically written in or erased. The nonlinear elements may be silicon PN junction diodes in which the reverse current is about $10^{-12}$ amperes at 1 volt reverse-bias and the forward current is about $10^{-3}$ amperes at 0.7 volt forward-bias.

More specifically now, assume voltages are applied such that transistor 12 is on and transistor 13 is off. Because transistor 12 is on, there is charge stored in its collector-base and emitter-base capacitances. The nonlinear elements and the power sources are arranged such that if the voltage supplied by power source $V_1$ is removed, all the nonlinear elements present a high impedance to the base of transistor 12 such that the charge stored in the collector-base and the emitter-base capacitances cannot rapidly discharge. If power source $V_1$ is restored within a sufficiently short time interval, the imbalance resulting from the charge still stored in transistor 12 will cause that transistor to turn on again.

The rate of charge decay may be illustrated by the following numerical example. It will take 0.1 second to change the voltage across a capacitance of $10^{-12}$ farads by 0.1 volt when this capacitance is being discharged by a current of $10^{-12}$ amperes.

The amount of remaining charge required to produce an imbalance sufficient to ensure that the same transistor turns on depends primarily upon how closely transistors 12 and 13, nonlinear elements 14 and 15, nonlinear elements 19 and 20, and resistors 16 and 17 are matched. Better matching implies less accumulated charge; and if perfect matching were possible, an infinitesimal amount of charge would be sufficient. The flip-flop is advantageously fabricated in integrated form wherein the components are physically close to each other in a common monolithic substrate, and close matching is automatically achieved.

It will be apparent that charge storage flip-flop 11 can be driven by a DC power source $V_1$. More important, however, circuit 11 also can be driven by an AC power source $V_1$ or by a periodically pulsed power source $V_1$ or by an aperiodically discontinuous but recurrent power source $V_1$.

To illustrate the potential reduction in average power dissipation by driving the flip-flop with a periodically pulsed source, assume the flip-flop draws 1 milliampere from a 2.0 volt source when the source is connected to the flip-flop. This is 2.0 milliwatts ($2 \times 10^{-3}$ watts) average power dissipation if the source is a DC source. Assume now that because of the charge storage feature the power source need be turned on only for about 100 nanoseconds, i.e., $10^{-7}$ seconds, every 0.1 second safely to maintain the state of the flip-flop, allowing adequate margins for error. This is a $10^6$ reduction in average power dissipation to $2 \times 10^{-9}$ watts.

More specifically now with reference to FIG. 2, assume that $V_3$ and $V_4$ are connected to terminals 103 and 104, respectively, such that the emitters of transistors 12 and 13 are maintained at about zero volt. Power source $V_1$ has two levels, a read level at about 2 volts and a down level of about zero volt. Power source $V_2$ also has two levels, a hold level at about +0.5 volt and an erase level at about −2.0 volts. With $V_1$ down and $V_2$ at the erase level, all four diodes are forward-biased, thus effectively connecting a low impedance to the base of each transistor such that both transistors are discharged.

With $V_1$ down and $V_2$ at the hold level, all four diodes are turned off and the transistor bases are connected to a high impedance. In this condition, information is written into the cell by establishing an imbalance between transistors 12 and 13 and then switching $V_1$ to the read level. This imbalance can be established by illuminating one of the transistors to produce photogenerated charge therein. Because of the high impedance connected to each transistor, the photogenerated charge is integrated by the parallel combination of emitter-base, collector-base, and diode capacitances. After a sufficient amount of photogenerated charge is accumulated in the illuminated transistor, $V_1$ is raised to the read level and the illuminated transistor turns on.

Alternatively, the imbalance required to write information into the cell can be established by applying a voltage differential between the emitters of transistors 12 and 13 and then switching $V_1$ to the read level.

With $V_1$ at the read level, $V_2$ at the hold level, and one of the transistors 12 or 13 on, charge is stored in the various capacitances of the transistor which is on. If $V_1$ is subsequently returned to the down level, all four diodes 14, 15, 19, and 20 are reverse-biased and thus present a high impedance to the base of both transistors 12 and 13 such that a relatively slow rate of decay of stored charge is ensured.

To nondestructively read information from circuit 11, $V_1$ is raised to the read level (2.0 volts) and a corresponding increase in current is detected in detector 24 if transistor 12 is on or in detector 25 if transistor 13 is on.

It will be appreciated that decayed charge is restored during a read operation, and so circuit 11 is advantageously included in a system designed such that the frequency of read operations is sufficient also to maintain the state of the charge storage flip-flops.

FIG. 3 is a generalized schematic diagram of an optical memory system 31 in which a charge storage flip-flop in accordance with this invention has advantageous application. As shown, system 31 consists of a laser source 32, the beam 33, from which can be directed randomly by a two-dimensional optical deflector, 34, to any one of a number of addresses on a storage plane, 35. Storage plane 35 comprises an array of holograms, each hologram, e.g., 36, in turn comprising an array of binary information. The system is arranged such that when any one hologram, e.g., 36, is illuminated by laser beam 33, a real image consisting of a pattern of light spots and dark spots is focused onto a readout plane, 37, containing a matrix of photodetectors. Whether a photodetector is illuminated or not illuminated corresponds to the logical "one" or "zero." The holograms are designed and positioned at addresses on storage plane 35 such that the image from each and every hologram falls at the same position on readout plane 37 so that no mechanical movement of the photodetection matrix is necessary.

In such a memory system, the total storage capacity is determined by the number of addresses that the deflection system can provide times the number of binary digits that can be stored in the hologram at any one address. The speed of such a memory system is determined primarily by the rate at which the deflection system can move the beam from one address to another and by the rate at which the information in a hologram image can be detected and processed. A more thorough discussion of optical memories is provided in the article by F. M. Smits and L. E. Gallaher, "Design Considerations for a Semipermanent Optical Memory," *Bell System Technical Journal*, Volume 47, No. 6, 1967, page 1,267.

Inasmuch as the conventional laser beam deflection systems are usually much slower than the electronic photodetection circuitry, it is desirable to store electrically a detected hologram image and process the information therein while the deflection system is moving the laser beam to the next desired address on the storage plane. For this reason, an array of photosensitive bistable storage elements, e.g., semiconductor charge storage flip-flops of the type shown in FIG. 2, are an advantageous readout means for an optical array. An array of flip-flops of the type shown in FIG. 2 are positioned so that the light spots and dark spots of the hologram image fall upon transistors 12 and 13. Information is stored in the holograms in a manner such that a light spot falls on only one of the transistors of each flip-flop at a given time. By convention, e.g., if a light spot falls on transistor 12 such that transistor 12 turns on, a logical "one" is stored in the flip-flop. If transistor 13 is on, a logical "zero" is stored. Obviously, the convention could just as well be reversed.

Figure 4:
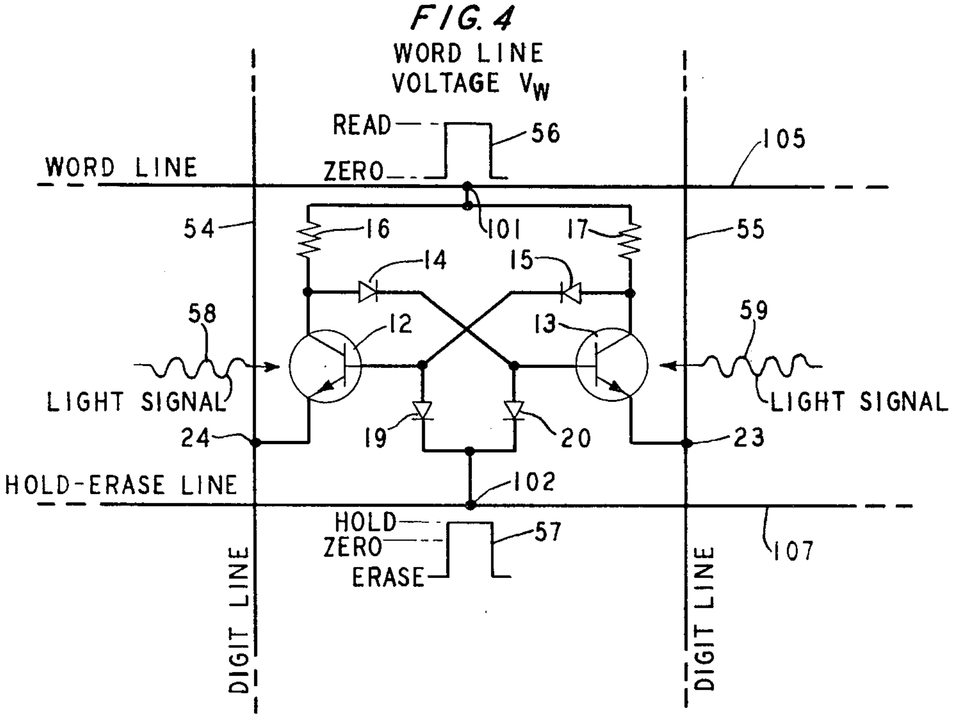
FIG. 4 shows a schematic diagram illustrating the connection of the circuit of FIG. 2 into a semiconductor memory of the type shown in FIG. 1.
Figure 4:
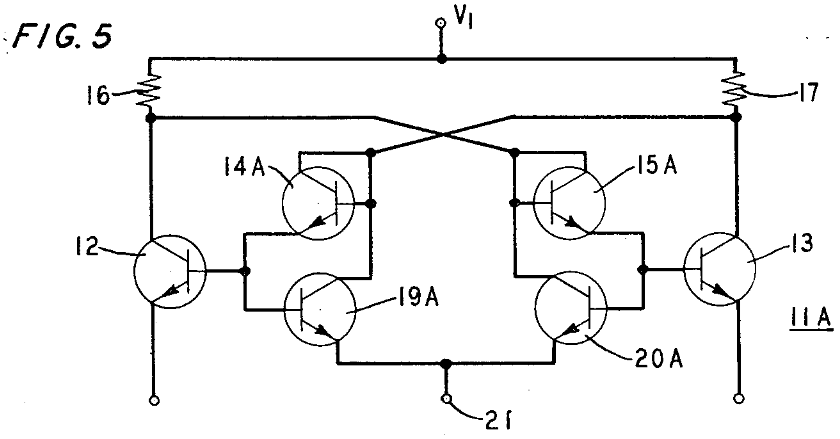
Figure 4:
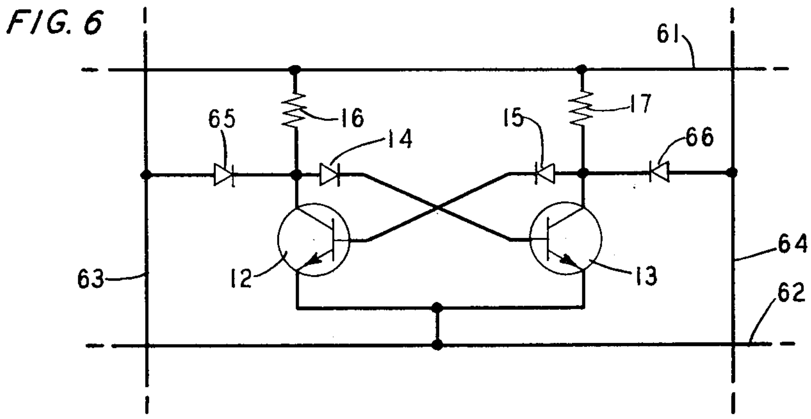

FIG. 4 is a schematic circuit diagram illustrating circuit 11 of FIG. 2 connected to the information lines of a word-organized semiconductor memory of the type shown in FIG. 1. Common terminal 101 is connected to word line conduction path 105 which is normally at a down level of about zero volt, but which can be switched to a read level of about 2.0 volts. Common terminal 102 is connected to a control line conduction path 107 which can be switched between an erase level of about −2.0 volts and a hold level of about 0.5 volt. Voltage waveforms 56 and 57 are included in FIG. 4 to illustrate the above-described voltage levels which are applied to lines 102 and 107. The emitters of transistors 12 and 13 are connected to separate ones 103 and 104, respectively, of a pair of digit lines. Information as to appropriate access circuitry for sensing and driving the information lines in a word-organized semiconductor memory is well known in the art and will not be discussed herein. Specific access circuitry is described in the copending application, (J. E. Iwersen 4-3-1) Ser. No. 614,489, filed Feb. 7, 1967, and assigned to the same assignee as this application.

In operation, as described with reference to FIG. 2 hereinabove, flip-flop 11 is discharged by bringing control line 107 to the electrically negative erase level while word line 105 is at the down level. In this mode, all four diodes 14, 15, 19, and 20 are forward-biased, thus effectively connecting a low impedance to the bases of transistors 12 and 13 such that both transistors are discharged.

For writing, the voltage on control line 107 is raised to the hold level such that all four diodes are turned off, thus presenting a high impedance to the bases of transistors 12 and 13. Then, for optical writing, a beam of light 58 or 59 is applied to either transistor 12 or transistor 13, respectively, for a predetermined time sufficient to generate enough charge in the illuminated transistor such that when the voltage on word line 105 is subsequently raised to the read level, the illuminated transistor will switch into the saturated mode. For writing with electrical signals, the potential of one of the digit lines 54 or 55 is raised so that when the voltage on word line 105 is subsequently raised to the read level, the transistor whose emitter is connected to the lower potential will switch into the saturated mode.

Once information has been written into circuit 11, the word line voltage can be returned to the down level without losing the stored information because of the charge storage feature described hereinabove.

For nondestructively reading information from circuit 11, the word line voltage is raised to the read level. The transistor, 12 or 13, which is on will conduct more current into its attached digit line, 103 or 104, respectively, than will the transistor which is off. The relative difference in current on the digit lines is translated by the access circuitry into an appropriate output signal.

FIG. 5 shows a schematic diagram of a modification of circuit 11 for advantageous use in integrating circuit embodiments. Fundamental to the integrated circuit art is the principle that two or more transistors may share a common isolation zone provided their collectors are electrically common. For the circuit in FIG. 2, the two transistors and four diodes each would have to be in a separately isolated zone, i.e., six isolated zones. This is generally undesirable in that each separate isolating means requires area, and minimum area is usually a prime objective in integrated circuits.

To reduce the number of required isolation zones, diodes 14, 15, 19, and 20 in FIG. 2 have been replaced by transistors 14A, 15A, 19A, and 20A in FIG. 5. The collector of transistor 14A is shorted to its base and the collector of transistor 15A is shorted to its base. The collector of transistor 14A is also connected to the collector of transistor 13, and the emitter of transistor 14A is connected to the base of transistor 12. The collector of transistor 15A is connected to the collector of transistor 12, and the emitter of transistor 15A is connected to the base of transistor 13. The collector of transistor 19A is connected to the collector of transistor 13; the base of transistor 19A is connected to the base of transistor 12; and the emitter of transistor 19A is connected to the common control terminal 21. The collector of transistor 20A is connected to the collector of transistor 12; the base of transistor 20A is connected to the base of transistor 13; and the emitter of transistor 20A is connected to common control terminal 21.

In operation, transistors 14A and 15A with their bases shorted to their collectors operate as diodes. Transistors 19A and 20A do not operate as diodes during the discharge operation because their bases and collectors are not connected together. However, the bases of transistors 12 and 13 will be adequately clamped to $V_2$ through the forward-biased base-emitter junctions of transistors 19A and 20A.

The important feature to be noted in FIG. 5 is that the collectors of transistors 12, 15A, and 20A are all connected together and are, therefore, electrically common. Similarly, the collectors of transistors 13, 14A, and 19A are electrically common. Thus, in integrated circuit form, circuit 11A in FIG. 5 requires only two isolation zones as opposed to the six such zones required by circuit 11 in FIG. 2.

The function of control line 102 and nonlinear elements 19 and 20 is to discharge the flip-flop and, therefore, to make it extremely sensitive to writing signals. This is important if the information is to be written optically, because the light signal available is typically limited. In a conventional electronically writable semiconductor memory, writing is accomplished by generating a voltage differential between the digit lines. Generation of relatively large writing signals, e.g., 0.7 volt, is not a problem. In this case, it may not be necessary to discharge the flip-flop before a writing operation so that the control line and the nonlinear elements connected to it can be omitted.

The operation of the semiconductor memory using charge storage flip-flops has to be periodically interrupted in order to subject all the flip-flops to reading operation. All the flip-flops of the memory are set during this operation and, therefore, the charge imbalance corresponding to the information stored in each flip-flop is restored. In order to minimize the duration of such an interruption, it is advantageous to raise all the word lines to the read level simultaneously. However, setting of all the flip-flops simultaneously will result in large currents flowing through the digit lines and may result in intolerable voltage imbalances which may affect the state assumed by the flip-flops.

The problem of unwanted voltage imbalances, i.e., noise, on digit lines may be avoided by using a diode-coupled, word-organized semiconductor memory of the type disclosed in U.S. Pat. No. 3,540,010, issued Nov. 10, 1970, to J. D. Heightley et al., and assigned to the same assignee as this application. FIG. 6 illustrates a charge storage flip-flop connected into a memory of that type. As shown in FIG. 6, matched flip-flop transistors 12 and 13 are connected through matched load impedances 16 and 17, respectively, to power line 61 which is common to all the flip-flops of the memory. The voltage on power line 61 is normally at a down level of about zero volt but is pulsed up to a voltage of about 2.0 volts to supply power to all the flip-flops in order to restore the information stored in them. Transistors 12 and 13 are cross coupled by diodes 14 and 15 to provide the charge storage feature. The emitters of transistors 12 and 13 are connected together and to a common word line 62, the voltage on which is normally about zero volt but which is pulsed negatively to about −2.0 volts for reading from the cell, and to about −4.0 volts for writing into the cells. Transistors 12 and 13 are coupled to digit lines 63 and 64, respectively, through diodes 65 and 66, respectively. The digit lines are normally at about −2 volts.

For reading, the voltage of the word line 62 is pulsed to about −2.0 volts and voltages of about −1.0 volts are applied to the digit lines through limiting resistors, thus tending to forward-bias coupling diodes 65 and 66. The coupling diode attached to the collector of the transistor which is on will conduct current from the digit line into the collector and the state of the flip-flop will be detected.

For writing, the voltages on the word line 62 and one of the digit lines are pulsed to about −4.0 volts. The voltage of about −1.0 volt is again applied to the second digit line through the limiting resistor. For example, if it is desired to set the flip-flop in such a way as to force transistor 12 into saturation and keep transistor 13 in the off state, about −1.0 volt is applied through a limiting resistor to the digit line 64. If, after the voltage on the word line 62 is reduced to about −4.0 volts, transistor 12 has started to conduct, then the current flowing from digit line 64 and through diodes 66 and 15 into the base of transistor 12 keeps transistor 12 on. But, if transistor 13 has started to conduct, then enough current is forced through diode 66 to develop voltage drop across the collector series resistance of transistor 13 sufficient to force some current from diode 66 into diode 15. Transistor 12 then starts to conduct and transistor 13 switches off, thus accomplishing the writing. Conversely, the transistor 13 can be forced to conduct if the voltage on digit line 64 is dropped to about −4.0 volts while a voltage of about −1.0 volt is applied to the digit line 63. After the writing is accomplished, the voltage on the word line is returned to about zero volt and the digit lines are returned to about −2.0 volts. It is clear that the diodes 65 and 66 isolate the flip-flops not associated with the words read out or written in from the noise produced by the current pulses in digit lines.

To restore the information in the memory, the voltage on the common line 61 is raised to about +2.0 volts. All the flip-flops are set simultaneously but no imbalance is introduced into the flip-flops by the large current flowing through the common and word lines, because the emitter of transistors 12 and 13 are connected together and because no current flows through the digit lines. Diodes 14 and 15 in FIG. 6 can be replaced by the transistors 14 and 15 as in FIG. 5. The flip-flops of FIG. 4 and FIG. 5 also can be connected into a diode-coupled memory. In case the optical writing is used, only one digit line with one coupling diode will be sufficient to accomplish the readout, because the presence or absence of the current in this digit line during the readout will indicate the state of the flip-flop.

It is to be understood that the various arrangements described are merely illustrative of the general principles of the invention. Various modifications will be apparent to a worker in the art without departing from the spirit and scope of the invention. For example, the NPN transistors can be replaced by PNP transistors provided the relevant voltages and diodes are reversed in polarity.

Furthermore, it will be apparent that the disclosed embodiments employing diodes in the cross coupling paths are not the only possible embodiments having nonlinear elements in the base paths of the flip-flop transistors. For example, a direct-coupled flip-flop having diodes in series with the load resistances instead of in the cross coupling paths could just as well be used instead for providing the desired impedance characteristics in the base paths.

What is claimed is:

1. Semiconductor storage apparatus comprising a plurality of bistable semiconductor storage cells;

means forming a plurality of conduction paths for connecting the cells to circuitry adapted for selectively controlling and sensing the state of each cell;

a source of electric power including means for alternately presenting a voltage of a first level and a voltage of a second and different level to the cells;

each storage cell comprising:

a pair of junction transistors each having emitter, base, and collector electrodes;

means connecting the collector electrode of each transistor to a first terminal, said first terminal being connected to the source of electric power;

means connecting the emitter electrode of each transistor to separate ones of said conduction paths; and a separate nonlinear impedance means connected into the base path of each transistor, each nonlinear impedance means including means for presenting a relatively high impedance in the base path in response to the power source voltage of the first level and for presenting a relatively low impedance in the base path in response to the power source voltage of the second level so that the state of the cell is maintained by a power source of varying voltage level.

2. Apparatus as recited in claim 1 wherein the first voltage level is in such relation to other voltage levels in the apparatus that no levels is supplied to the cell while the source is at the first level and wherein the second voltage level is different from the first level and is in such relation to said other voltage levels that power is supplied to the cell while the source is at the second level.

3. Apparatus as in claim 2 wherein the transistors are phototransistors.

4. Apparatus as in claim 3 in combination with means for illuminating one of the transistors of each pair for a time sufficient to set the state of the storage cell.

5. Apparatus as recited in claim 2 wherein the nonlinear impedance means comprise a separate diode connected between the collector electrode of each transistor and the base electrode of the other transistor.

6. Apparatus as recited in claim 5 wherein the transistors are of the NPN type and the collector electrode of each transistor is connected to the anode of a said separate diode, the cathode of which diode is connected to the base electrode of the other transistor.

7. Apparatus as recited in claim 5 additionally comprising:

a pair of diodes connecting the base electrode of each transistor to a second common terminal;

control potential means connected to said second terminal and including means for supplying third and fourth voltage levels to said second terminal, the third level being sufficient to turn on the pair of diodes so that the base of each transistor is connected to a low impedance for discharging the transistors and the fourth level being sufficient to turn off the pair of diodes so that a relatively very high impedance is presented by the pair of diodes to the bases of the transistors.

8. Apparatus as recited in claim 7 further characterized in that the power source means and the control potential means are synchronized such that the fourth voltage level is supplied by the control potential means while the first voltage level is maintained by the power source means.

9. A semiconductor flip-flop comprising a pair of junction transistors each having emitter, base, and collector electrodes, characterized in that each transistor includes a nonlinear impedance means for presenting a relatively low impedance to the base of each transistor when power is supplied to the flip-flop and for presenting a relatively very high impedance to the base of each transistor for ensuring a relatively slow discharge of charge stored in the emitter-base capacitance and the collector-base capacitance of one of the transistors after the power supply voltage is removed; and that the flip-flop is in combination with means for discontinuously, but recurrently, applying power to the flip-flop.

10. A flip-flop as recited in claim 9 wherein the nonlinear impedance means comprise separate diodes connected between the collector of each transistor and the base of the other transistor.

11. In an optical memory of the type having a light beam, an optical deflector, and a storage plane comprising an array of holograms in which information is stored and wherein the information stored in each particular hologram is read out by deflecting the light beam to illuminate that particular hologram so that there is produced on a readout plane a real image containing a pattern of light spots and dark spots, improved photodetection means for detecting the pattern and for translating the pattern into electrical signals corresponding to the information stored in the holograms, the improved photodetection means comprising:

an array of bistable semiconductor memory cells, said cells positioned in the readout plane of the optical memory;

means forming a plurality of conduction paths for connecting the cells to circuitry adapted for selectively sensing the state of each cell;

each of said cells comprising:

a pair of photosensitive transistors each having emitter, base, and collector electrodes;

means connecting the collector electrodes of each transistor to a first common terminal adapted for connection to a source of electric power;

means connecting the emitter electrode of each transistor to separate ones of said conduction paths;

a first pair of nonlinear impedance means connecting the collector electrode of each transistor to the base electrode of the other transistor; and a second pair of nonlinear impedance means connecting the base electrode of each transistor to a common terminal adapted for connection to a control potential, said control potential having at least a hold level and an erase level different from the hold level;

said pairs of nonlinear impedance means and said control potential levels being in relation such that when the control potential is at the erase level, the base of each transistor is connected to a low impedance through which the transistors are discharged; and when the control potential is at the hold level, said second pair of nonlinear impedance means present a relatively very high impedance to the base of each transistor and said first pair of nonlinear impedance means present a relatively low impedance to the base of each transistor when the power supply voltage is applied to the first common terminal and a relatively very high impedance to the base of each transistor when the power supply voltage is removed from the cell so that the state of the cell is maintainable by a discontinuous but recurrent power source.

12. Apparatus as recited in claim 11 wherein the first pair of nonlinear impedance means comprises a separate diode connected between the collector of each transistor and the base of the other transistor, and the second pair of nonlinear means comprise a separate diode connected between the base electrode of each transistor and the second common terminal.

13. Apparatus as recited in claim 12 wherein the transistors are of the NPN type, the diodes of the first pair are disposed such that the collector of each transistor is connected to the anode of a said separate diode, the cathode of which diode is connected to the base electrode of the other transistor, and the diodes of the second pair are disposed such that the base electrode of each transistor is connected to the anode of a said separate diode, the cathode of which diode is connected to said second common terminal.

14. Apparatus as recited in claim 11 wherein both pairs of nonlinear impedance means comprise transistors.

* * * * *